(12) United States Patent
Jeremiah

(10) Patent No.: US 12,472,646 B2
(45) Date of Patent: *Nov. 18, 2025

(54) OBJECT GRIPPING MECHANISM

(71) Applicant: Intelligrated Headquarters, LLC, Mason, OH (US)

(72) Inventor: Grant Repke Jeremiah, Steeleville, IL (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/419,392

(22) Filed: Jan. 22, 2024

(65) Prior Publication Data
US 2024/0157582 A1  May 16, 2024

Related U.S. Application Data

(63) Continuation of application No. 18/059,331, filed on Nov. 28, 2022, now Pat. No. 11,919,151, which is a
(Continued)

(51) Int. Cl.
*B25J 15/06* (2006.01)
*B25J 9/10* (2006.01)
(Continued)

(52) U.S. Cl.
CPC .......... *B25J 15/0616* (2013.01); *B25J 9/104* (2013.01); *B25J 15/0061* (2013.01); *B25J 18/025* (2013.01); *B25J 18/04* (2013.01)

(58) Field of Classification Search
CPC .. B25J 15/0061; B25J 15/0616; B25J 15/086; B25J 9/104; B25J 18/04; B66C 1/0243; B65G 47/915; B65G 47/918
(Continued)

(56) References Cited

U.S. PATENT DOCUMENTS

| | | |
|---|---|---|
| 4,065,001 A | 12/1977 | Ohnaka |
| 4,351,553 A | 9/1982 | Rovetta et al. |

(Continued)

FOREIGN PATENT DOCUMENTS

| | | |
|---|---|---|
| DE | 102004013058 A1 | 9/2005 |
| DE | 102013105383 B3 | 7/2014 |

(Continued)

OTHER PUBLICATIONS

CN Notice of Allowance Mailed on Feb. 9, 2024 for CN Application No. 202011351235, 4 page(s).
(Continued)

*Primary Examiner* — Douglas A Hess
(74) *Attorney, Agent, or Firm* — Alston & Bird LLP

(57) ABSTRACT

An object gripping mechanism is provided for use with a robotic arm. A robotic arm and method of manufacturing an object gripping mechanism are also provided. The object gripping mechanism includes an attachment modular configured to connect the object gripping mechanism to the robotic arm. The object gripping mechanism also includes a plurality of retractable arms each pivotably connected with the attachment modular. The object gripping mechanism also includes one or more movement mechanisms collectively configured to pivot the plurality of retractable arms to a desired position. The object gripping mechanism further includes a drive mechanism positioned within each of the plurality of retractable arms and configured to pivot the object engagement feature using a gear and timing belt configuration.

20 Claims, 11 Drawing Sheets

Related U.S. Application Data continuation of application No. 16/730,395, filed on Dec. 30, 2019, now Pat. No. 11,534,927.

(51) Int. Cl.
  *B25J 15/00* (2006.01)
  *B25J 18/02* (2006.01)
  *B25J 18/04* (2006.01)

(58) Field of Classification Search
  USPC .......................................................... 294/65
  See application file for complete search history.

(56) References Cited

U.S. PATENT DOCUMENTS

| | | | |
|---|---|---|---|
| 4,767,143 | A | 8/1988 | Michael et al. |
| 4,897,015 | A | 1/1990 | Abbe et al. |
| 4,921,395 | A | 5/1990 | Sahlin |
| 5,178,512 | A | 1/1993 | Skrobak |
| 5,222,409 | A | 6/1993 | Dalakian |
| 5,765,444 | A | 6/1998 | Bacchi et al. |
| 6,592,323 | B1 | 7/2003 | Hsieh |
| 7,281,739 | B2 * | 10/2007 | Kniss .................. B25J 15/0061 294/907 |
| 8,701,519 | B2 | 4/2014 | Todorov |
| 8,827,337 | B2 | 9/2014 | Murata et al. |
| 9,199,375 | B2 | 12/2015 | Miyoshi |
| 10,040,202 | B2 | 8/2018 | Alonso et al. |
| 10,124,486 | B2 * | 11/2018 | Marttinen ............... F16D 7/027 |
| 10,926,403 | B1 | 2/2021 | Asokan et al. |
| 11,534,927 | B2 | 12/2022 | Jeremiah |
| 11,919,151 | B2 * | 3/2024 | Jeremiah ................ B25J 18/025 |
| 2008/0111388 | A1 | 5/2008 | Kniss |
| 2013/0057004 | A1 | 3/2013 | Murata et al. |
| 2014/0103676 | A1 | 4/2014 | Nammoto et al. |
| 2014/0197652 | A1 | 7/2014 | Wang et al. |
| 2014/0375072 | A1 | 12/2014 | Cho |

FOREIGN PATENT DOCUMENTS

| | | |
|---|---|---|
| DE | 102015107394 A1 | 11/2016 |
| EP | 2551071 A1 | 1/2013 |
| EP | 3575043 A2 | 12/2019 |
| JP | 07-283289 A | 10/1995 |

OTHER PUBLICATIONS

English translation of CN Notice of Allowance dated Feb. 9, 2024 for CN Application No. 202011351235, 2 page(s).

Advisory Action (PTOL-303) Mailed on Feb. 24, 2022 for U.S. Appl. No. 16/730,395.
Advisory Action (PTOL-303) Mailed on Mar. 15, 2022 for U.S. Appl. No. 16/730,395.
CN Office Action Mailed on Mar. 29, 2023 for CN Application No. 202011351235, 7 page(s).
CN Office Action Mailed on Oct. 11, 2023 for CN Application No. 202011351235, 7 page(s).
European search opinion Mailed on Jun. 2, 2021 for EP Application No. 20213628.
European search report Mailed on Jun. 2, 2021 for EP Application No. 20213628.
European Search Report Mailed on Jun 2, 2021for EP Application No. 20213628.9, 8 page(s).
Examiner Interview Summary Record (PTOL-413) Mailed on Feb. 24, 2022 for U.S. Appl. No. 16/730,395.
Final Office Action Mailed on Dec. 9, 2021 for U.S. Appl. No. 16/730,395.
Final Rejection Mailed on Aug. 21, 2023 for U.S. Appl. No. 18/059,331, 5 page(s).
Final Rejection Mailed on Dec. 9, 2021 for U.S. Appl. No. 16/730,395.
Non-Final Office Action Mailed on Apr. 15, 2022 for U.S. Appl. No. 16/730,395.
Non-Final Office Action Mailed on Aug. 25, 2021 for U.S. Appl. No. 16/730,395.
Non-Final Rejection Mailed on Apr. 15, 2022 for U.S. Appl. No. 16/730,395.
Non-Final Rejection Mailed on Apr. 20, 2023 for U.S. Appl. No. 18/059,331, 6 page(s).
Non-Final Rejection Mailed on Aug. 25, 2021 for U.S. Appl. No. 16/730,395.
Notice of Allowance and Fees Due (PTOL-85) Mailed on Aug. 31, 2022 for U.S. Appl. No. 16/730,395.
Notice of Allowance and Fees Due (PTOL-85) Mailed on Feb. 5, 2024 for U.S. Appl. No. 18/059,331, 2 page(s).
Notice of Allowance and Fees Due (PTOL-85) Mailed on Oct. 26, 2023 for U.S. Appl. No. 18/059,331, 5 page(s).
Notice of Allowance Mailed on Aug. 31, 2022for U.S. Appl. No. 16/730,395, 6 page(s).
EP Office Action Mailed on Jun. 14, 2024 for EP Application No. 20213628, 5 page(s).
EP Office Action Mailed on Jun. 26, 2024 for EP Application No. 20213628, 5 page(s).
Notification of Oral Proceeding Mailed on Mar. 6, 2025 for EP Application No. 20213628, 5 page(s).

* cited by examiner

OBJECT GRIPPING MECHANISM

CROSS-REFERENCE TO A RELATED APPLICATIONS

This patent application is a continuation of U.S. patent application Ser. No. 18/059,331, filed Nov. 28, 2022, which is a continuation of U.S. patent application Ser. No. 16/730,395, filed Dec. 30, 2019 (now U.S. Pat. No. 11,534,927, issued Dec. 27, 2022), each of which is incorporated herein by reference in its entirety.

TECHNOLOGICAL FIELD

Example embodiments of the present disclosure relate generally to robotic arms for moving objects, and more particularly, to adjustable robotic arms for moving objects.

BACKGROUND

With increased reliance on automation, there is an increased use of robots to move objects, such as boxes, envelopes, unpackaged goods, and/or the like from one place to another. However, warehouses and the like often have varying sizes of objects and a singular robot may need to be able to safely move each different size in order to be efficient. However, current robotic object gripping mechanisms often struggle to create a sufficient engagement when adjusted to allow for different sized objects. Applicant has identified several technical challenges associated with robotic sorting arms. Through applied effort, ingenuity, and innovation, many of these identified challenges have been overcome by developing solutions that are included in embodiments of the present disclosure, many examples of which are described in detail herein.

BRIEF SUMMARY

The illustrative embodiments of the present disclosure relate to object gripping mechanisms for use with robotic arms. In an example embodiment, an object gripping mechanism is provided for use with a robotic arm. The object gripping mechanism includes an attachment modular configured to connect the object gripping mechanism to the robotic arm. The object gripping mechanism also includes a plurality of retractable arms each pivotably connected with the attachment modular. Each of the plurality of retractable arms includes an object engagement feature configured to selectably engage an object. The object gripping mechanism further includes one or more movement mechanisms collectively configured to pivot the plurality of retractable arms to a desired position. The object gripping mechanism still further includes a drive mechanism positioned within each of the plurality of retractable arms and configured to pivot the object engagement feature relative to a corresponding retractable arm. The drive mechanism includes a gear operably engaged with one of the one or more movement mechanisms and a timing belt operably connected with the gear and extending to the object engagement feature. The timing belt is configured to pivot the object engagement feature relative to the corresponding retractable arm based on movement of the one of the one or more movement mechanisms.

In some embodiments, the object engagement feature includes a plunger and a plunger connector. In such an embodiment, the plunger connector is operably coupled to the retractable arm, such that the plunger remains at least substantially parallel to a surface of an object during operation. In some embodiments, the plunger is rigidly attached to the plunger connector. In some embodiments, the object engagement feature is configured to pivot synchronously with the corresponding retractable arm. In some embodiments, each of the one or more retractable arms are controlled via a separate movement mechanism.

In some embodiments, the retractable arms define a plurality of gears configured to independently adjust the retractable arm and the object engagement feature disposed on said retractable arm. In some embodiments, each of the retractable arms further includes an arm actuating gear configured to engage an arm gear. In such an embodiment, the arm gear is rotatably coupled with a timing belt gear at a first end of the timing belt and the object engagement feature is attached at a second end of the timing belt. In some embodiments, the object gripping mechanism also includes a center arm configured to remain in a central location during extension and retraction of the one or more retractable arms.

In some embodiments, the retractable arms extend between a pivot end and a distal end, and the object engagement feature is pivotable about the distal end. In some embodiments, the at least one of the one or more movement mechanisms include a motor. In some embodiments, the object engagement feature is a vacuum gripper. In some embodiments, the plurality of retractable arms includes at least four retractable arms. In some embodiments, the one or more movement mechanisms is embodied as a single movement mechanism configured for synchronously moving all of the at least four retractable arms. In some embodiments, the plurality of retractable arms are movable between a retracted position and an extended position.

In another example embodiment, a robotic arm is provided. The robotic arm includes an attachment modular configured to connect the object gripping mechanism to the robotic arm. The robotic arm also includes a plurality of retractable arms each pivotably connected with the attachment modular. Each of the plurality of retractable arms includes an object engagement feature configured to selectably engage an object. The robotic arm also includes one or more movement mechanisms collectively configured to pivot the plurality of retractable arms to a desired position. The robotic arm further includes a drive mechanism positioned within each of the plurality of retractable arms and configured to pivot the object engagement feature relative to a corresponding retractable arm. The drive mechanism includes a gear operably engaged with one of the one or more movement mechanisms. The drive mechanism also includes a timing belt operably connected with the gear and extending to the object engagement feature. The timing belt is configured to pivot the object engagement feature relative to the corresponding retractable arm based on movement of the one of the one or more movement mechanisms.

In some embodiments, the attachment modular is attached to the robotic arm via one or more fasteners. In some embodiments, the object engagement feature is configured to pivot synchronously with the corresponding retractable arm. In some embodiments, the retractable arms are configured to extend between a pivot end and a distal end, and the object engagement feature is pivotable about the distal end. In some embodiments, the retractable arms define a plurality of gears configured to independently adjust the retractable arm and the object engagement feature disposed on said retractable arm.

In still another example embodiment, a method of manufacturing an object gripping mechanism is provided for use with a robot. The method includes providing an attachment modular configured to connect the object gripping mechanism to the robotic arm. The method also includes attaching a plurality of retractable arms to the attachment modular. Each retractable arm pivotably connected with the attachment modular. The method further includes providing one or more movement mechanisms in communication with one or more retractable arms. The one or more movement mechanism are collectively configured to pivot the plurality of retractable arms to a desired position The method still further includes providing an object engagement feature connected to the retractable arm configured to selectably engage an object. The plurality of retractable arms each provide a drive mechanism positioned within each of the plurality of retractable arms and configured to pivot the object engagement feature relative to a corresponding retractable arm. The drive mechanism includes a gear operably engaged with one of the one or more movement mechanisms. The drive mechanism also includes a timing belt operably connected with the gear and extending to the object engagement feature. The timing belt is configured to pivot the object engagement feature relative to the corresponding retractable arm based on movement of the one of the one or more movement mechanisms.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1A:
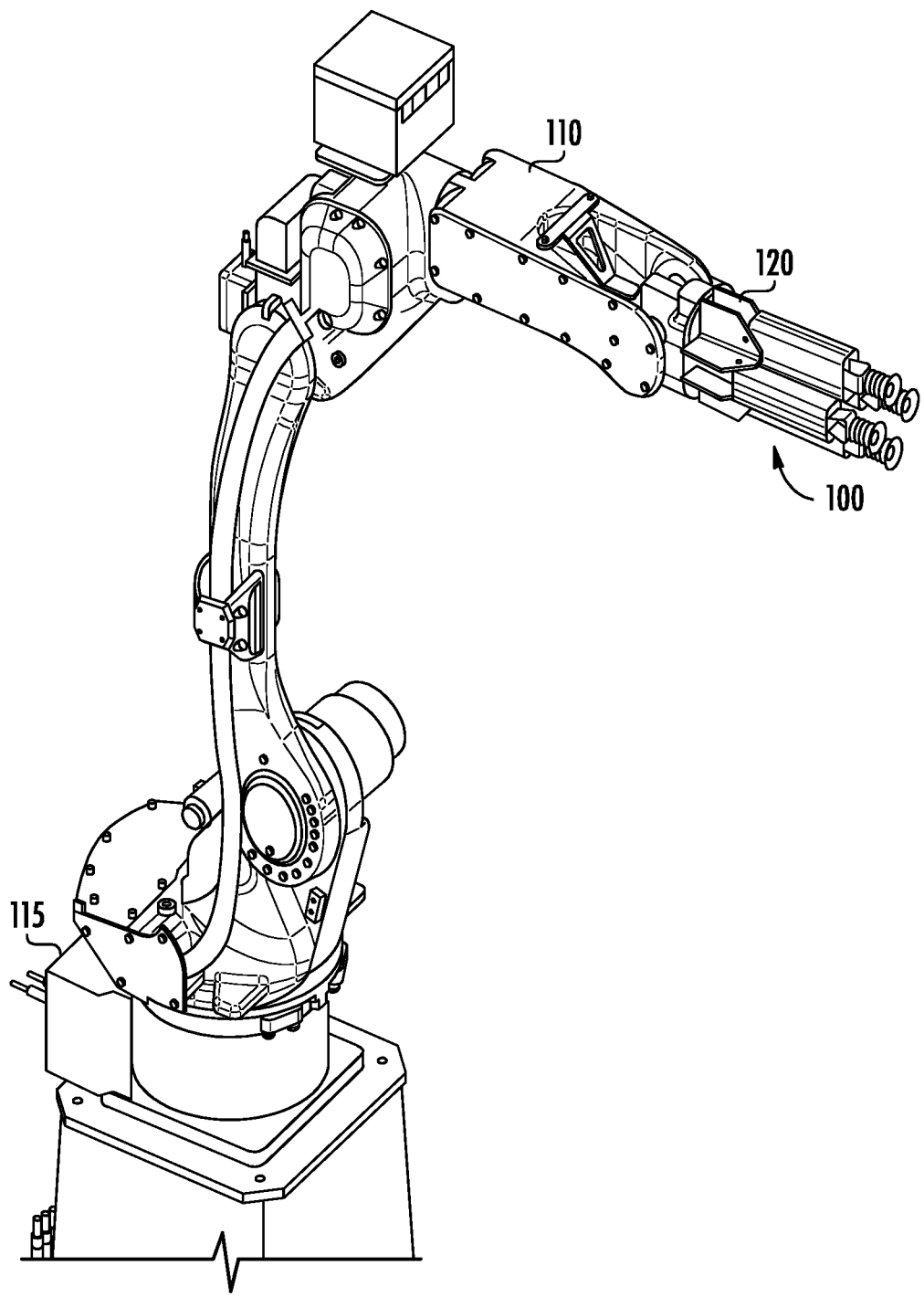
FIGS. 1A-1C illustrates an example embodiment of an object gripping mechanism attached to a robot arm in various positions.

Some embodiments of the present disclosure will now be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The terms "or" and "optionally" are used herein in both the alternative and conjunctive sense, unless otherwise indicated. The terms "illustrative" and "exemplary" are used to be examples with no indication of quality level. Like numbers refer to like elements throughout.

The components illustrated in the figures represent components that may or may not be present in various example embodiments described herein such that embodiments may include fewer or more components than those shown in the figures while not departing from the scope of the disclosure.

Turning now to the drawings, the detailed description set forth below in connection with the appended drawings is intended as a description of various example configurations and is not intended to represent the only configurations in which the concepts described herein may be practiced. The detailed description includes specific details for the purpose of providing a thorough understanding of various concepts with like numerals denoting like components throughout the several views. However, it will be apparent to those skilled in the art of the present disclosure that these concepts may be practiced without these specific details.

Robotic arms are used to move and transport various sized objects, such as boxes, envelopes (padded or unpadded), pallets, irregularly shaped items, or the like. For example, robotic arms may utilize vacuum suction grippers configured for forming a suction-based holding force between an object engagement feature and a surface of the object to grip the object during movement. For example, the object engagement feature may comprise a vacuum grip plunger such as those shown in the figures, although other object engagement features may be utilized, such as a closeable grip (e.g., opposing fingers configured to close and grip a portion of an object therebetween), a needle-based gripping mechanism, a tacky-surface based gripping mechanism, an electromagnetic-based gripping mechanism, and/or the like. In certain embodiments, robotic arms may utilize a plurality of object engagement features operating in concert to support larger and/or heavier objects during movement. During operation, the connection between the plunger and the object should be sufficiently secure so as to provide for a sufficient suction-based holding force to allow for the robotic arm to move the object without risk of dropping the object. However, current adjustable arm attachments do not provide for a consistent plunger placement across a plurality of sized and shaped objects and therefore often creates incomplete engagement with objects being moved into different arm positions. Various embodiments of the present disclosure allow for the arms to be retracted or extended with minimal or no change in the orientation of the object engagement feature, such that the plungers may still be parallel with the object regardless of the object size. The embodiments discussed herein allow for consistent object engagement by the same object gripping mechanism across various sizes of objects during operation.

Figure 1B:
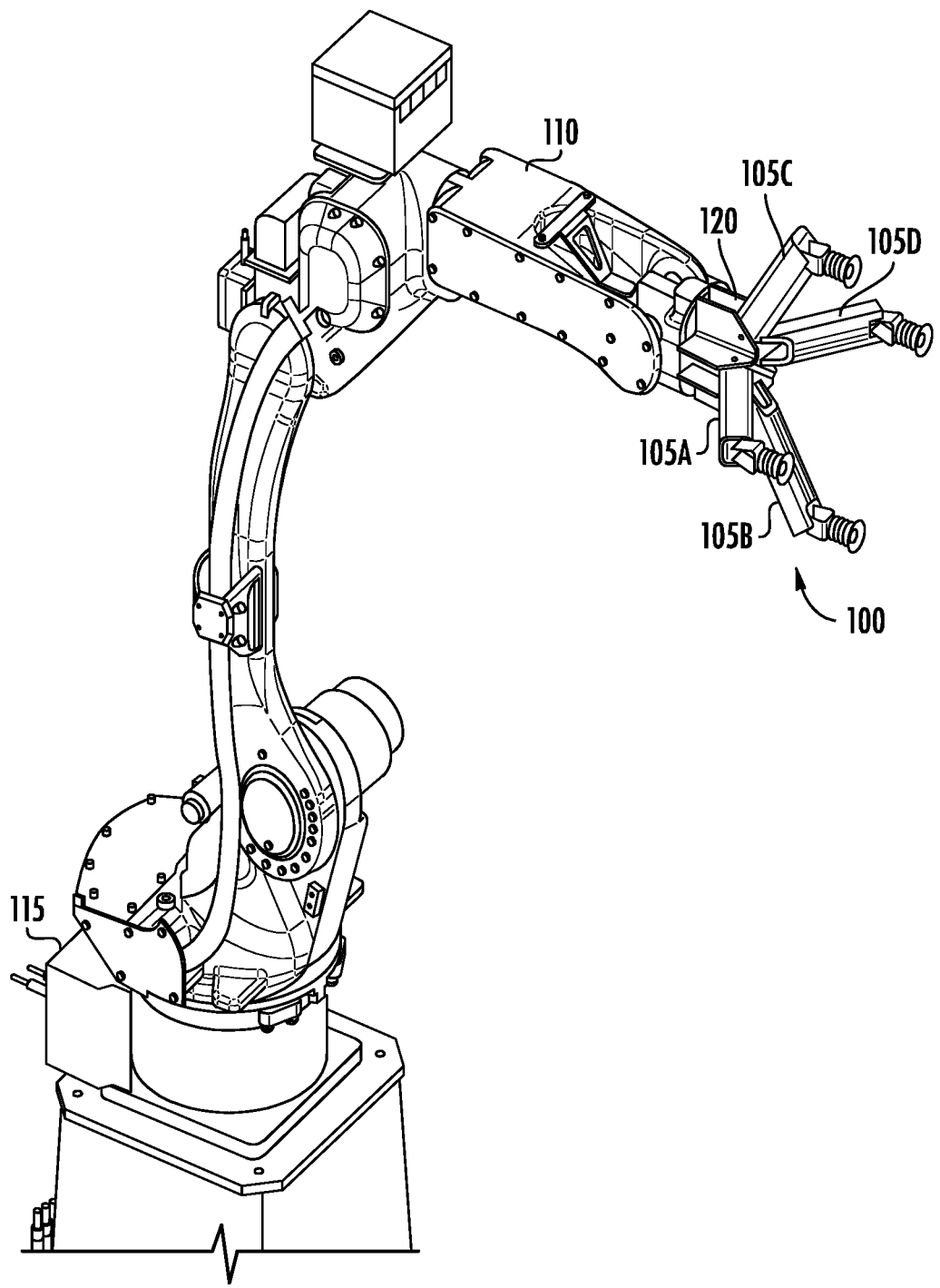
Figure 1C:
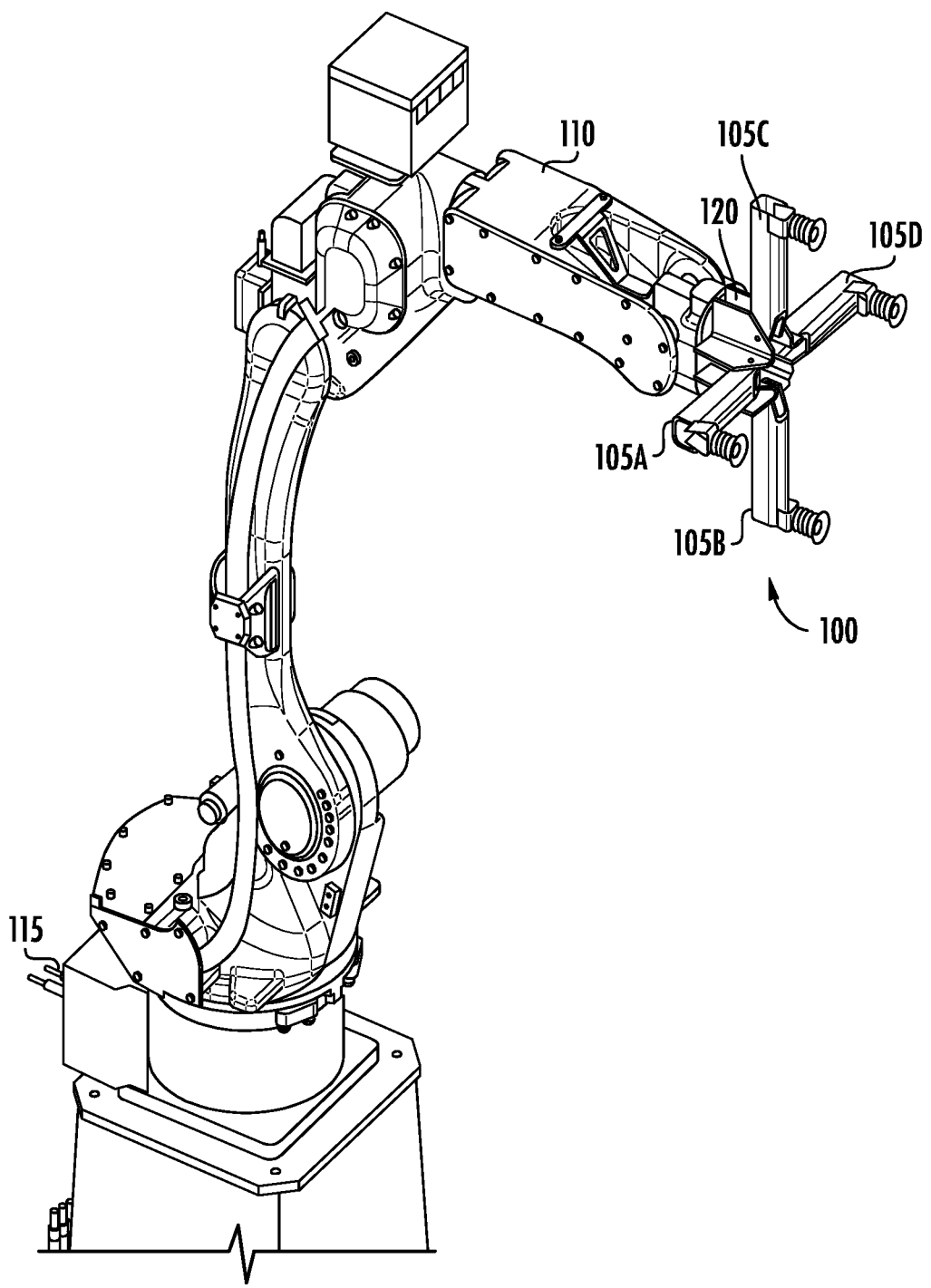

FIGS. 1A-1C illustrate an example embodiment of an object gripping mechanism attached to a robotic arm in various positions. In various embodiments, the object gripping mechanism 100 may be installed on a robotic arm, such as the robotic arm 110 shown in FIGS. 1A-C. In various embodiments, the object gripping mechanism 100 may be attached to the robotic arm via the attachment modular 120. The attachment modular 120 of certain embodiments comprises one or more fastener engagement features configured to enable fasteners to be used to secure the attachment modular 120—and by extension the object gripping mechanism 100—relative to the robotic arm 110. The fastener engagement features may be embodied as through holes, blind holes, threaded holes, interference fit mechanisms, and/or the like, as configured to interact with corresponding features of the robotic arm 110. In various embodiments, the attachment modular 120 may be altered to allow the object gripping mechanism 100 to be attached to different robotic arms or the like. In various embodiments, the object gripping mechanism 100 may be controlled via a controller (e.g., controller 115). For example, the object gripping mechanism 100 may be electrically (or pneumatically or hydraulically) coupled to and/or through the robotic arm 110. In various embodiments, the controller may be used to move the object gripping mechanism 100 between different position, such as the retracted position (e.g., FIG. 1A), the extended position (e.g., FIG. 1C), and/or therebetween (e.g., FIG. 1B).

In some embodiments, as discussed herein, the object gripping mechanism 100 may include one or more retractable arms (e.g., arms 105A-105D). In various embodiments, the retractable arms may include an object engagement feature (e.g., a plunger connector and plunger discussed herein). In various embodiments, the object engagement feature may be configured to selectably engage an object. In some embodiments, the object gripping mechanism 100 may also include stationary arms (e.g., a center arm configured to remain in the same position in an instance the retractable arms are moved).

Each of the retractable arms of the illustrated embodiments extend between a pivot end and a distal end. The pivot end of each retractable arm is pivotably secured relative to the attachment modular 120, and the distal end has an object engagement feature secured thereto. The retractable arms of the illustrated embodiments are hollow and may enclose movement components, wiring, tubes (e.g., pneumatic and/or hydraulic), and/or the like, extending therethrough.

In various embodiments, the robotic arm 110 and object gripping mechanism 100 may include one or more sensors (e.g., position sensors, vision sensors, cameras, light sensors, pressure sensors, and/or the like) configured to determine the size and/or orientation of an object. In some embodiments, the object gripping mechanism 100 may include one or more sensors configured to determine the engagement of the object engagement features with the object. For example, one or more pressure sensors may be used to determine the suction of a plunger on an object during operation.

Figure 2:
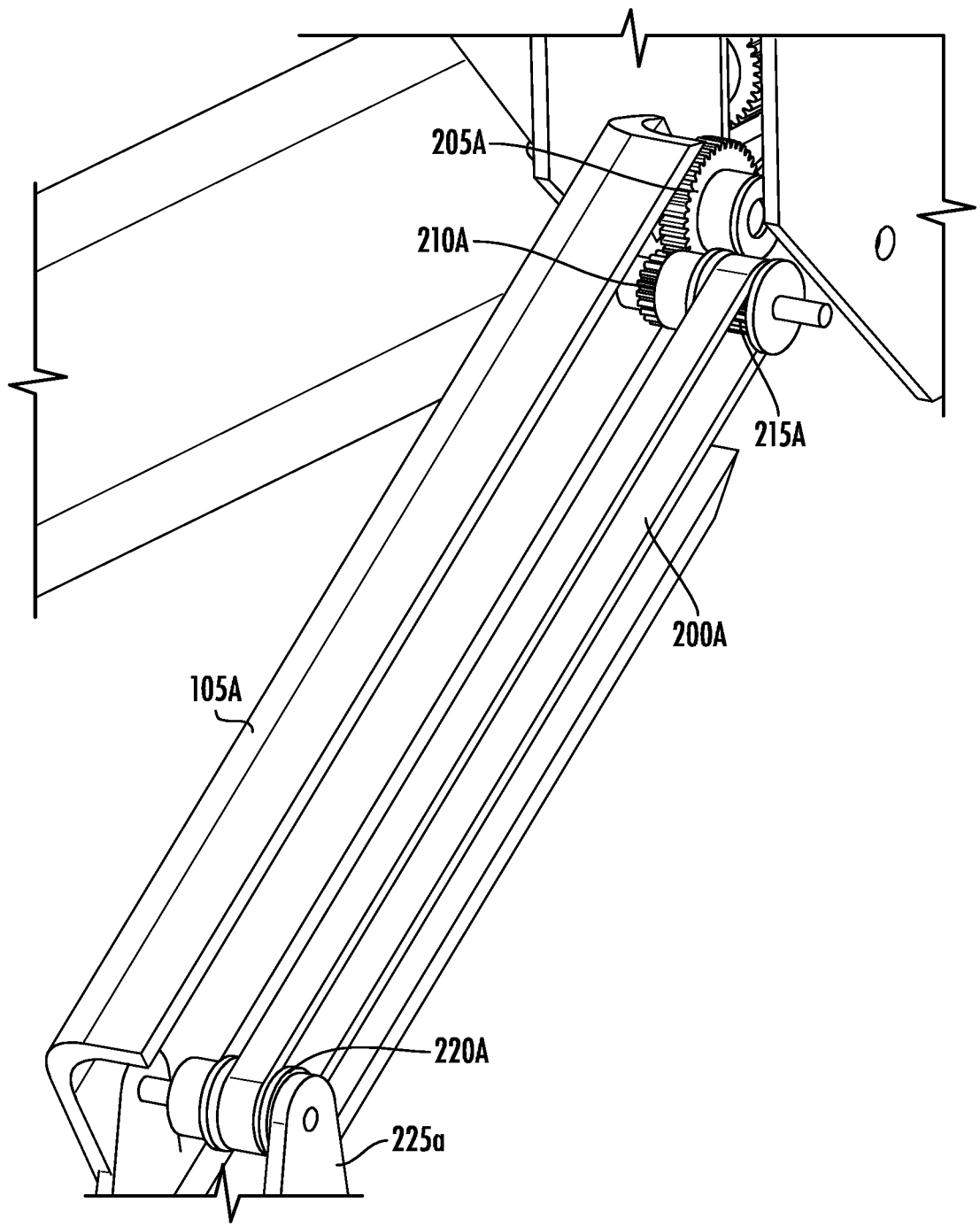
FIG. 2 illustrates a close up, cutaway view of a retractable arm mechanism in accordance with an example embodiment.

FIG. 2 illustrates an interior view of a retractable arm mechanism in accordance with an example embodiment. In various embodiments, the arm mechanism (e.g., retractable arm 105A) may have an object engagement feature attached to a distal end via a plunger connector 225A and a plunger 125A. As shown, the arm mechanism 105A may include a drive mechanism. In various embodiments, the drive mechanism may include a gear operably engaged with one of the one or more movement mechanisms and a timing belt 200A operably connected with the gear and extending to the object engagement feature. In various embodiments, the timing belt 200A may be configured to pivot the object engagement feature relative to the corresponding retractable arm 105A based on movement of one or more of the movement mechanisms. In some embodiments, the object engagement feature may be configured to pivot synchronously with the corresponding retractable arm 105A (i.e., the arm 105A pivots at the same time as the plunger 125A so as to maintain a desired orientation of the plunger 125A relative to an object and/or the attachment modular 120). In some embodiments, the drive mechanism may be configured with a number of gears (e.g., an arm activation gear 205A, an arm gear 210A, a timing belt gear 215A, and a plunger connector gear 220A) and a timing belt 200A configured to translate the rotation provided by a movement mechanism. In various embodiments, the movement mechanism may be a device configured for rotational movement or a device configured for linear movement, such as a motor, solenoid, a motor and rack-and-pinion gearing combination, a pneumatic mechanism (e.g., a pneumatic piston), a hydraulic mechanism (e.g., a hydraulic piston), or the like. In some embodiments, the movement mechanism may be configured to pivot the arm mechanism 105A. In various embodiments, the vacuum plunger may be rotated via a timing belt or another plunger rotation mechanism configured for rotational movement or a device configured for linear movement, such as a motor, solenoid, a motor and rack-and-pinion gearing combination, a pneumatic mechanism, a hydraulic mechanism, or the like. In various embodiments, the timing belt 200A may be configured to pivot the object engagement feature relative to the corresponding retractable arm based on movement of the one of the one or more movement mechanisms.

In various embodiments, one or more movement mechanisms may be provided and configured to interact with the gears. For example, the movement mechanism may be configured to engage the arm activation gear 205A in an instance in which the arm is being retracted or extended. In some embodiments, one movement mechanism may be used exclusively for one retractable arm. For example, each of the retractable arms may have a corresponding movement mechanism configured to move the retractable arm. In some embodiments, a single retractable arm mechanism (e.g., arms 105A-105D) may have a plurality of movement mechanisms configured to move different parts of the arm mechanism. For example, one motor may control the angle of the arm mechanism (e.g., how retracted the arm is in a given instance), while another motor may be controlling the angle of the plunger connector 225A. In some embodiments, one movement mechanism may engage with a plurality of the arm mechanisms. In yet other embodiments, a single movement mechanism may be configured to collectively move a plurality of retractable arms. For example, a single motor may be utilized to translate a rack assembly configured to interact with arm activation gears 205A of each of the plurality of retractable arms, such that movement of the rack assembly causes uniform and simultaneous (synchronous) movement of all retractable arms. In some embodiments, a single movement mechanism may be configured for synchronously moving all retractable arms. For example, in an instance there are four retractable arms (e.g., retractable arms 105A-105D), a single movement mechanism may configured to move all four arms at the same time. In various embodiments, components of the retractable arm mechanism may comprise a metal (e.g., stainless steel, aluminum, and/or the like), a plastic, and/or the like. For example, the housing may comprise a plastic material. In some embodiments, the plungers as discussed herein may comprise a plastic urethane.

In various embodiments, the arm gear 210A and the timing belt gear 215A may be rigidly connected relative to one another and/or may share the same center of rotation, such that as the arm activation gear 205A engages with and rotates the arm gear 210A, the timing belt gear 215A is also rotated, causing the timing belt 200A to rotate. In various embodiments, the timing belt 200A may be configured to transfer the rotational force to the object engagement feature (e.g., in the opposite direction). For example, the timing belt 200A may engage with the plunger connector gear 220A, which may be rotationally coupled with the plunger connector 225A such that the object engagement feature may rotate in the opposite direction of the arm mechanism 105A. In various embodiments, the components discussed herein may be present in each of the other retractable arms discussed herein (e.g., arms 105A-105D). While various embodiments discussed herein show four retractable arms, various embodiments may include more or less arms based on the configuration of the object gripping mechanism.

Figure 3A:
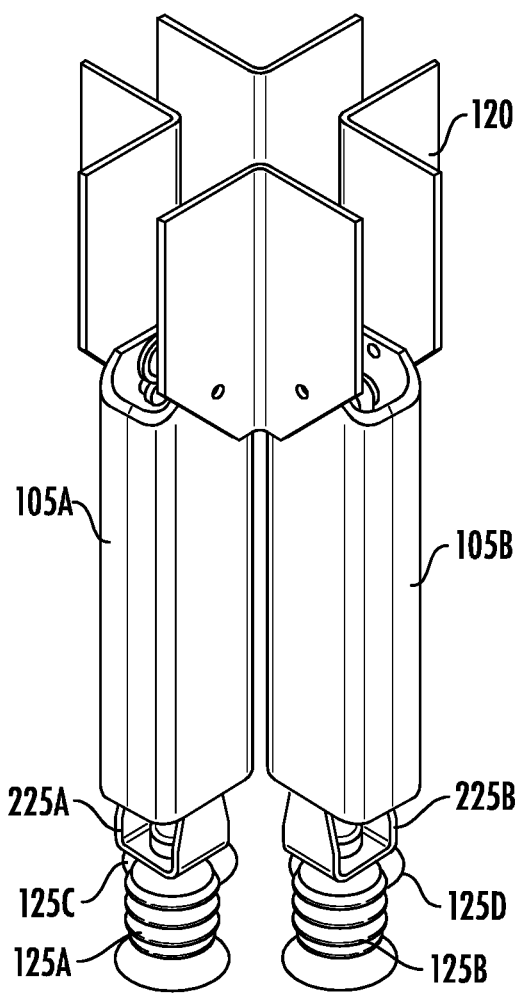
FIGS. 3A and 3B illustrate an object gripping mechanism in the retracted position in accordance with an example embodiment.
Figure 3B:
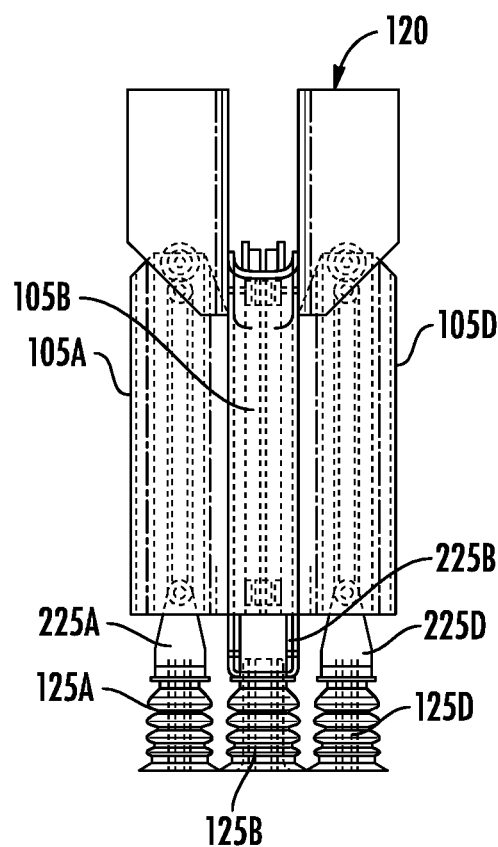

FIG. 3A illustrates an object gripping mechanism in the retracted position in accordance with an example embodiment. As shown, in the retracted position, the retractable arm mechanisms may be at least substantially parallel with one another. FIG. 3B illustrates that the retractable arm mechanisms 105A-105D may each have the internal components discussed in reference to FIG. 2 above. In various embodiments, in the retracted position, the plungers 125A-125D may be close to one another, such as for use in narrow areas and/or with smaller objects. As shown, the plungers 125A-125D may remain generally parallel with the retractable arms 105A-105D in the retracted position and may extend linearly away from the distal ends of respective retractable arms 105A-105D.

Figure 4A:
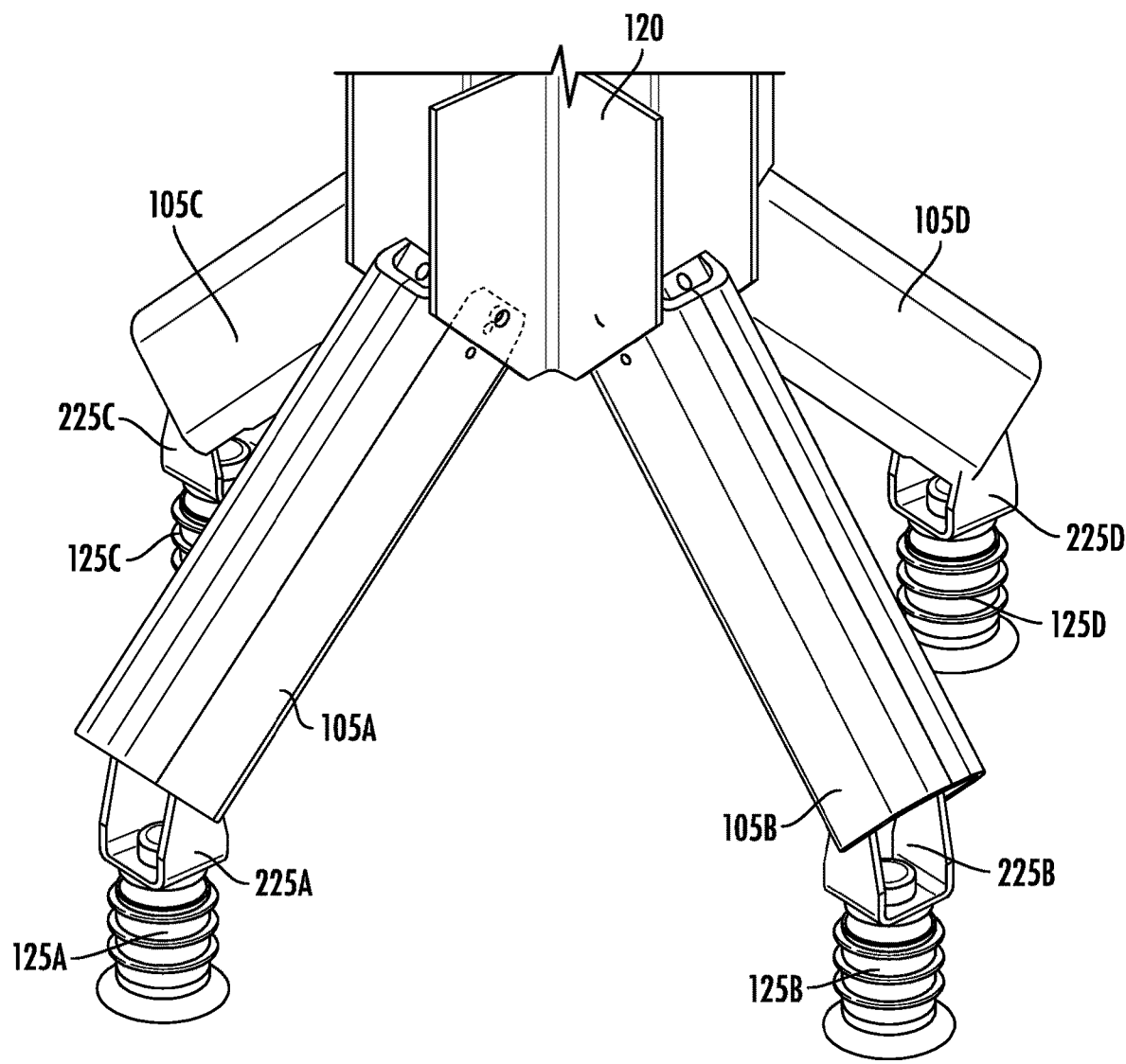
FIG. 4A illustrates an object gripping mechanism between the extended position and retracted position in accordance with an example embodiment.
Figure 4B:
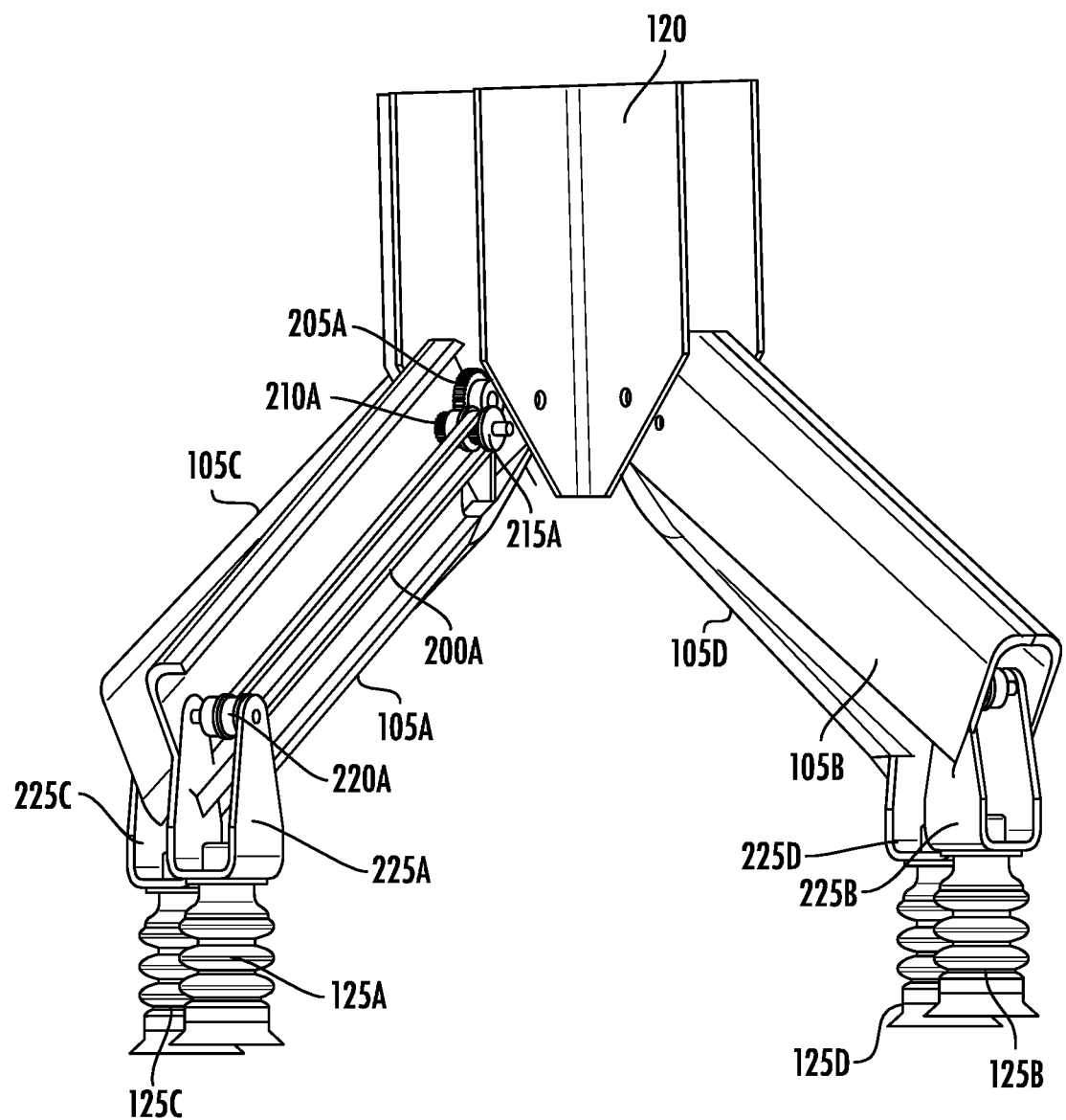
FIG. 4B illustrates a cutaway view of one of the retractable arms in accordance with an example embodiment.

FIG. 4A illustrates the object gripping mechanism 100 as the retractable arms 105A-105D are moving from the retracted position (FIG. 3A) towards the extended position (FIG. 5A) in accordance with an example embodiment. As shown, in an instance in which the retractable arms 105A-105D begin to extend (e.g., move away from one another), the plunger connectors 225A-225D and subsequently the plungers 125A-125D may remain generally parallel to a flat surface of an object (not shown). For example, the angle of the plungers 125A may remain generally parallel to the attachment modular 120. As discussed herein, in some embodiments, one or more of the plungers 125A-125D may be configured to remain at a constant angle during movement (e.g., to engage a non-flat surface of an object). For example, one or more of the plungers 125A-125D may be angled to engage a slanted side of an object. FIG. 4B shows the interior components of the retractable arm 105A in an instance the arm is in the position shown in FIG. 4A. In various embodiments, the timing belt 200A may be configured to transfer the rotational force provided by an movement mechanism (not shown) in order for the plunger connector 225A to remain in the same general orientation relative to an object. As discussed herein, as the arm activation gear 205A rotates the arm gear 210A, the retractable arm 105A may begin to rotate as well (e.g., either retracting or extending). In various embodiments, the timing belt 200A is configured to cause the plunger 125A to rotate in the opposite direction (e.g., such that the plunger 125A remains in the same orientation relative to an object. In various embodiments, the plungers 125A-125D shown in FIG. 4A may be able grip a larger object than the retracted position shown in FIG. 3A.

However, it should be understood that in certain embodiments, the orientation of the plungers may be independently maneuverable relative to the corresponding retractable arm, for example, to independently orient the plunger to engage the angle of a surface of an object to be engaged.

Figure 5A:
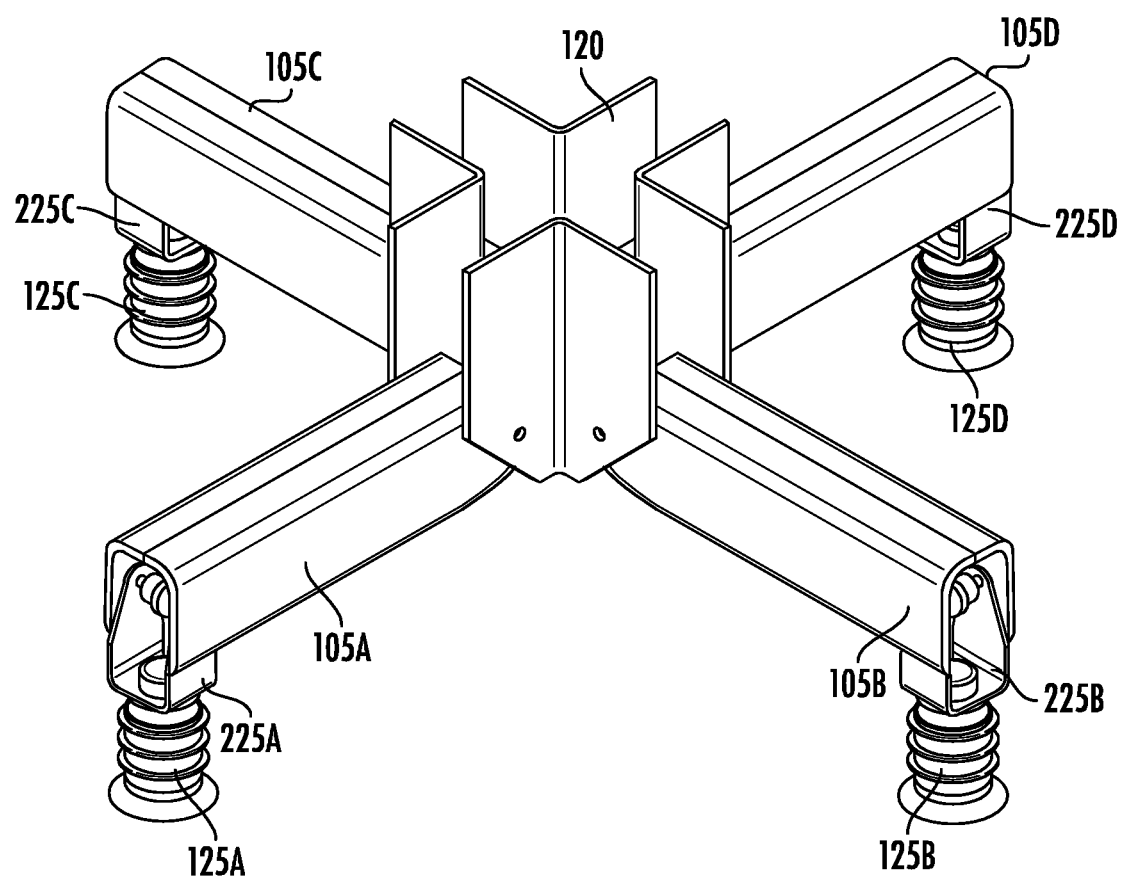
FIG. 5A illustrates an object gripping mechanism in the extended position in accordance with various embodiment of the present disclosure.
Figure 5B:
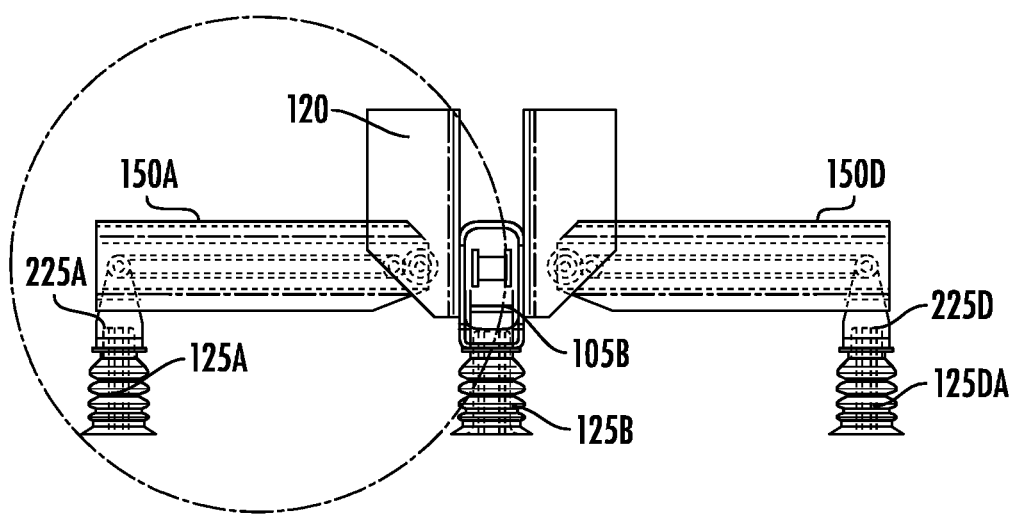
FIGS. 5B and 5C illustrate interior views of the retractable arm mechanisms in accordance with an example embodiment.
Figure 5C:
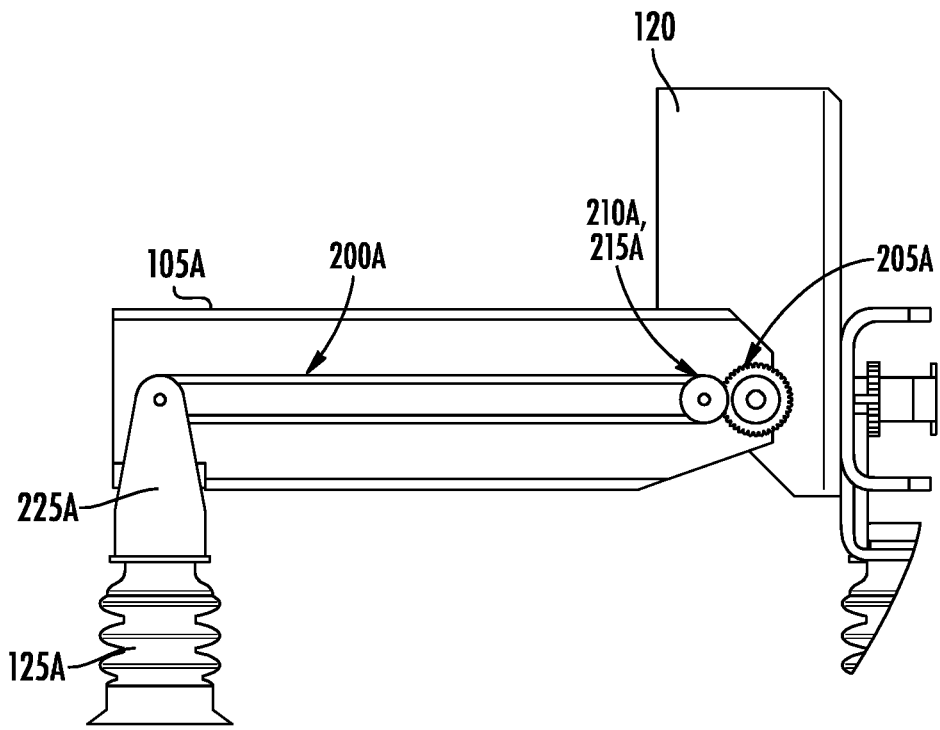

FIG. 5A illustrates an object gripping mechanism in the extended position in accordance with various embodiments of the present disclosure. As shown, the extended position may be characterized by the retractable arms 105A-105D rotationally positioned at least approximately 90 degrees from the retracted position. In various embodiments, in the extended position, the retractable arm (e.g., arm 105A) may be approximately perpendicular to the object engagement feature (e.g., the plunger connector 225A and the plunger 125A). As shown in FIGS. 5B and 5C, in the extended position, the plunger connector 225A may have rotated approximately 90 degrees in the inward direction in an instance the retractable arm 105A has rotated approximately 90 degree in the outward direction, such that the plunger 125A may be generally perpendicular to the timing belt 200A. In various embodiments, in an instance the object gripping mechanism 100 is being retracted, the plunger 125A may continue to travel in the opposite direction of rotation from the given arm (e.g., as the arm travels inward towards the retracted position, the timing belt (e.g., 200A) may cause the object engagement feature (e.g., the plunger connector 225A and the plunger 125A) to rotate proportionally in the outward direction.

Figure 6:
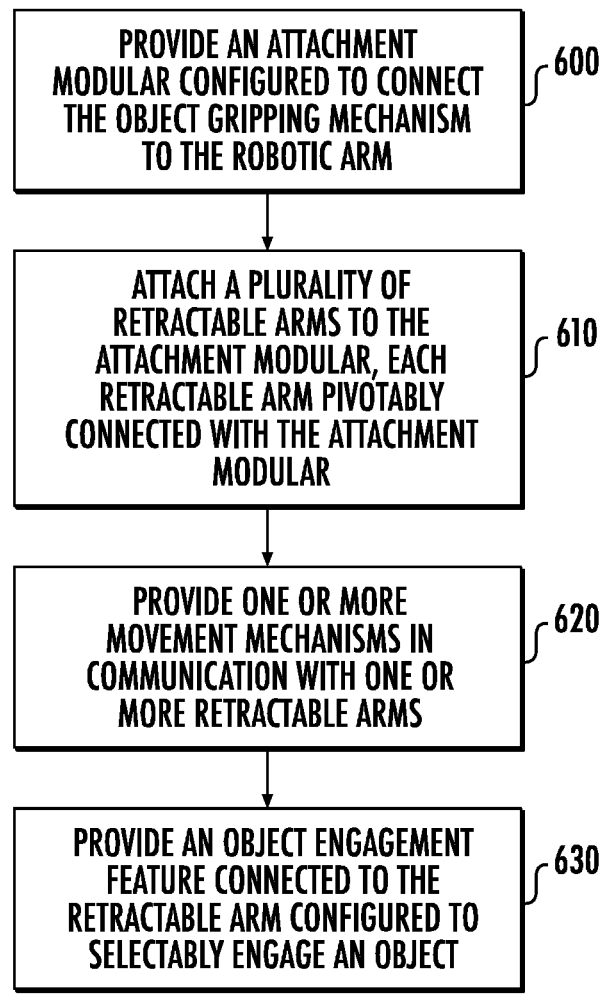
FIG. 6 is a flowchart illustrating the method of manufacturing an object gripping mechanism in accordance with an example embodiment.

FIG. 6 is a flowchart illustrating the method of manufacturing an object gripping mechanism in accordance with an example embodiment. Referring now to Block 600 of FIG. 6, the method may include providing an attachment modular 120 configured to connect the object gripping mechanism 100 to the robotic arm 110. As discussed herein, the attachment modular 120 design may be based on the type of robot the object gripping mechanism 100 may be attached during operation. For example, different robots may have different attachment points and therefore necessitate different attachment modular designs. In some embodiments, the design of the attachment modular 120 may be based on the number of arms that are a part of the object gripping mechanism 100. For example, the attachment modular 120 may provide an attachment point for one or more retractable arms (e.g., retractable arms 105A-105D) that may be allowed to extend and retract during operation. Additionally, the attachment modular 120 may provide an attachment point of one or more fixed arms (e.g., a central arm that is fixed during movement of the retractable arms).

Referring now to Block 610 of FIG. 6, the method may include attaching a plurality of retractable arms to the attachment modular. In various embodiments, each of the retractable arms may be pivotably connected to the attachment modular 120. As discussed herein, the number of retractable arms may vary based on the usage of the object gripping mechanism 100. For example, more retractable arms may allow for a more stable engagement with large objects. In various embodiments, the retractable arms may include an arm activation gear 205A in communication with one of the movement mechanisms. Additionally, the arm activation gear 205A may engage with the arm gear 210A, which causes the arm to rotate either outwardly or inwardly. In some embodiments, the arm gear 210A shares a point of rotation with the timing belt gear 215A. In various embodiments, the timing belt 200A may rotate and turn the plunger connector gear 220A opposite the timing belt gear 215A. In such an embodiment, the plunger connector 225A may rotate proportionally to the retractable arm in the opposite direction, such that the orientation of the plunger 125A remains constant.

Referring now to Block 620 of FIG. 6, the method may include providing one or more movement mechanisms in communication with one or more retractable arm. In some embodiments, one or more movement mechanisms may be housed within the attachment modular 120. As discussed herein, the movement mechanisms may be in communication with one or more retractable arms (e.g., retractable arms 105A-105D), such that the movement mechanism provide the rotational force to move the retractable arm(s) between the extended position and the retracted position, and vice versa. In various embodiments, the placement of the movement mechanism may differ between specific embodiments, for example, based on the number of arms/cups, as well as their size, manufacturer, and/or the like. In various embodiments, the movement mechanisms may be custom to an individual tool depending on the type and size of product to be gripped.

Figure 7:
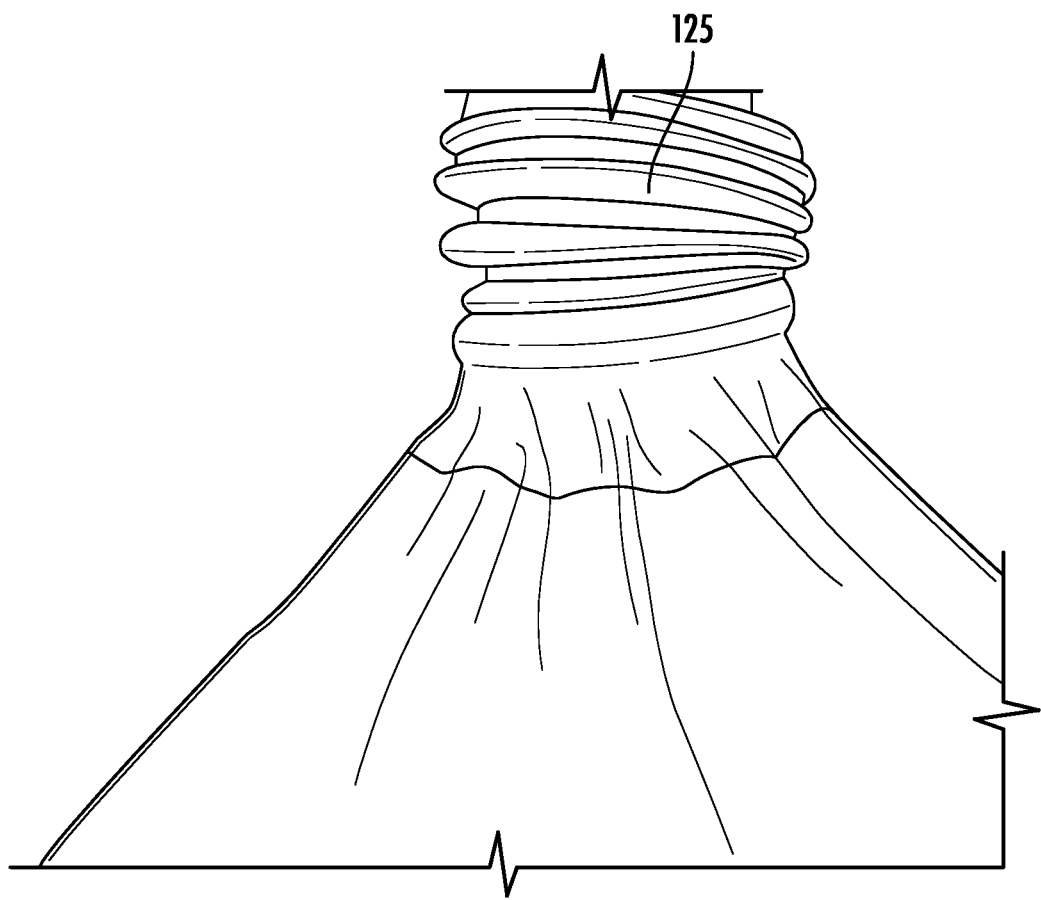
FIG. 7 illustrates an example vacuum plunger for use in various embodiments of the present disclosure.

Referring now to Block 630 of FIG. 6, the method may include providing an object engagement feature connected to the retractable arms configured to engage with an object in an instance in which the object gripping mechanism is deployed. As discussed above, the object engagement feature may include a plunger connector (e.g., plunger connector 225A) and a plunger (e.g., plunger 125A). In various embodiments, the plunger may be rigidly attached to the plunger connector, such that the plunger moves along with the plunger connector. As discussed above, the plunger connector (e.g., 225A) may share a common rotation shaft with the plunger connector gear (e.g., 220A), such that in an instance in which the timing belt (e.g., 220A) causes the plunger connector gear to rotate, the plunger connector and subsequently the plunger also rotates (e.g., in the opposite direction of the retractable arm rotation). FIG. 7 illustrates a vacuum plunger 125 used in various embodiments securely gripping object via vacuum suction.

In various embodiments, the object gripping mechanism may be used for engaging picking up an object, for example, to manipulate or move the object. For example, the robotic arm may identify the size and/or configuration of the object to pick up (e.g., via one or more sensors). In various embodiments, the object size and configuration may be determined via one or more sensors, such as a vision sensor, contact sensor, pressure sensor, vacuum sensor, and/or the like. For example, a vacuum sensor may be mounted on or inside the object gripping mechanism itself or mounted on the robotic arm. As such, the vacuum sensor may be configured to sense when a product has been grasped and ready to lift. In some embodiments, vision sensors, cameras, photo eyes, and the like may also be used to inform the system that a product is pickable and which product is best suited to be picked up. In some embodiments, the one or more movement mechanisms may engage the retractable arms, such that the arms are either retracted or extended based on the size of the object and the current position of the arms.

Additionally, as the object engagement features pivots synchronously with each arm in the opposite direction. In other embodiments, such as those embodiments in which the robotic arm does not operate in association with one or more sensors, the orientation of the movement mechanisms may be predefined and set for a plurality of objects. For example, if a robotic arm is to be utilized to manipulate a plurality of identical objects, the relative positioning of the various retractable arms need not be reset between picking each of the plurality of objects.

In an instance the retractable arms are now located in the correct position based on the object, the object engagement feature may engage with the object. In some embodiments, such as in an instance in which the object engagement feature includes a vacuum plunger, the object engagement feature (e.g., a vacuum plunger such as that shown in FIG. 7) may be activated in order to increase the engagement between the object engagement feature (e.g., the plunger may suction to the object). In some embodiments, the robotic arm may include an engagement sensor configured to determine whether the object engagement features are sufficiently engaged with an object. For example, the robotic arm may include a pressure sensor configured to determine the suction of a plunger. In an instance in which the object engagement feature is sufficiently engaged with the object, the robotic arm may be moved such that the object is moved to another location. In some embodiments, in an instance in which the object has been moved to the desired location, the object engagement feature may be disengaged from the object (e.g., via de-suctioning of the plunger). In various embodiments, each of the object engagement features (e.g., the vacuum plungers discussed herein) may be independently actuatable in certain embodiments, so as to engage an irregular shaped object.

It must be noted that, as used in this specification and the appended claims, the singular forms "a," "an," and "the" include plural referents unless the content clearly dictates otherwise.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments, but not other embodiments.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present disclosure are disclosed herein; however, it is to be understood that the disclosed embodiments are merely exemplary, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

While it is apparent that the illustrative embodiments herein disclosed fulfill the objectives stated above, it will be appreciated that numerous modifications and other embodiments may be devised by one of ordinary skill in the art.

Accordingly, it will be understood that the appended claims are intended to cover all such modifications and embodiments, which come within the spirit and scope of the present disclosure.

What is claimed is:

1. An object gripping mechanism for use with a robotic arm, the object gripping mechanism comprising:
a plurality of retractable arms connected to an attachment modular, wherein each retractable arm of the plurality of retractable arms is pivotably connected with the attachment modular, wherein each of the plurality of retractable arms comprises an object engagement feature configured to selectably engage an object, wherein the object engagement feature comprises a plunger and a plunger connector, wherein the plunger connector is operably coupled to the retractable arm, such that the plunger remains at least substantially parallel to a surface of the object during operation; and
a drive mechanism positioned within each of the plurality of retractable arms and configured to pivot the object engagement feature relative to a corresponding retractable arm, wherein the drive mechanism comprises a timing belt connected to at least the plunger connector, wherein the timing belt causes the plunger connector to rotate relative to a movement of the retractable arm such that an orientation of the plunger remains static relative to the object.

2. The object gripping mechanism of claim 1, further comprises one or more movement mechanisms collectively configured to pivot the plurality of retractable arms to a desired position.

3. The object gripping mechanism of claim 2, wherein the drive mechanism comprises a gear operably engaged with one of the one or more movement mechanisms, wherein the timing belt is operably connected with the gear and extending to the object engagement feature, wherein the timing belt is configured to pivot the object engagement feature relative to the corresponding retractable arm based on movement of the one of the one or more movement mechanisms.

4. The object gripping mechanism of claim 3, wherein each of the plurality of retractable arms further comprise an arm actuating gear configured to engage an arm gear, wherein the arm gear is rotatably coupled with a timing belt gear at a first end of the timing belt, wherein the object engagement feature is attached at a second end of the timing belt.

5. The object gripping mechanism of claim 2, wherein at least one of the one or more movement mechanisms comprise a motor.

6. The object gripping mechanism of claim 2, wherein the plurality of retractable arms comprises at least four retractable arms.

7. The object gripping mechanism of claim 6, wherein the one or more movement mechanisms is embodied as a single movement mechanism configured for synchronously moving all of the at least four retractable arms.

8. The object gripping mechanism of claim 1, wherein the plunger is rigidly attached to the plunger connector.

9. The object gripping mechanism of claim 1, wherein each of the plurality of retractable arms are controlled via a separate movement mechanism.

10. The object gripping mechanism of claim 1, wherein the plurality of retractable arms define a plurality of gears configured to independently adjust the retractable arm and the object engagement feature disposed on said retractable arm.

11. The object gripping mechanism of claim 1, wherein the plurality of retractable arms extend between a pivot end and a distal end, and the object engagement feature is pivotable about the distal end.

12. The object gripping mechanism of claim 1, wherein the object engagement feature is a vacuum gripper.

13. The object gripping mechanism of claim 1, wherein the plurality of retractable arms is movable between a retracted position and an extended position.

14. A robotic arm comprising:
a plurality of retractable arms connected to an attachment modular, wherein each retractable arm of the plurality of retractable arms is pivotably connected with the attachment modular, wherein each of the plurality of retractable arms comprises an object engagement feature configured to selectably engage an object, wherein the object engagement feature comprises a plunger and a plunger connector, wherein the plunger connector is operably coupled to the retractable arm, such that the plunger remains at least substantially parallel to a surface of the object during operation; and
a drive mechanism positioned within each of the plurality of retractable arms and configured to pivot the object engagement feature relative to a corresponding retractable arm, wherein the drive mechanism comprises a timing belt connected to at least the plunger connector, wherein the timing belt causes the plunger connector to rotate relative to a movement of the retractable arm such that an orientation of the plunger remains static relative to the object.

15. The robotic arm of claim 14, wherein the attachment modular is attached to the robotic arm via one or more fasteners.

16. The robotic arm of claim 14, wherein the plurality of retractable arms are configured to extend between a pivot end and a distal end, and the object engagement feature is pivotable about the distal end.

17. The robotic arm of claim 14, wherein the plurality of retractable arms define a plurality of gears configured to independently adjust the retractable arm and the object engagement feature disposed on said retractable arm.

18. The robotic arm of claim 14, wherein the plurality of retractable arms is movable between a retracted position and an extended position.

19. The robotic arm of claim 14, wherein the plunger is rigidly attached to the plunger connector.

20. The robotic arm of claim 14, wherein the object engagement feature is a vacuum gripper.

* * * * *